(12) United States Patent
Grove et al.

(10) Patent No.: US 9,451,328 B1
(45) Date of Patent: Sep. 20, 2016

(54) METHODS AND SYSTEMS FOR VARIABLE SPEED PLAYBACK WITH BI-DIRECTIONALITY

(71) Applicant: The DIRECTV Group, Inc., El Segundo, CA (US)

(72) Inventors: Aaron C. Grove, Los Angeles, CA (US); Stanley Y. Wang, Pittsburgh, PA (US); Jerry M. White, Orange, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 29 days.

(21) Appl. No.: 14/592,142

(22) Filed: Jan. 8, 2015

(51) Int. Cl.
*H04N 5/783* (2006.01)
*H04N 21/472* (2011.01)
*G11B 27/00* (2006.01)
*H04N 21/439* (2011.01)
*H04N 21/262* (2011.01)

(52) U.S. Cl.
CPC ....... *H04N 21/47217* (2013.01); *G11B 27/005* (2013.01); *H04N 21/26283* (2013.01); *H04N 21/4392* (2013.01)

(58) Field of Classification Search
CPC .................. H04N 21/47217; H04N 21/4392; H04N 21/26283; G11B 27/005

USPC ....... 386/326, 328, 338, 343, 339, 340, 347, 386/350
See application file for complete search history.

(56) References Cited

U.S. PATENT DOCUMENTS

2008/0107402 A1* 5/2008 Angiolillo ............ H04N 5/4403
386/234

* cited by examiner

*Primary Examiner* — Robert Chevalier
(74) *Attorney, Agent, or Firm* — Guntin & Gust, PLC; Jospeh Hrutka

(57) ABSTRACT

Embodiments disclose systems and methods for variable speed playback with bi-directionality. One example implementation may comprise a computing device receiving a request to modify a playback speed of a recorded program. In response, the computing device may provide an interactive menu that enables the selection of a new playback speed for the computing device to provide the recorded program to a graphical interface (e.g., television). The computing device may further receive a selection of a given playback speed for the computing device to provide the recorded program to the graphical interface and process the video component and the corresponding audio component of the program for playout at the given playback speed. The computing device may provide the processed video component and the processed corresponding audio component in a combination for playout at the given playback speed.

20 Claims, 7 Drawing Sheets

METHODS AND SYSTEMS FOR VARIABLE SPEED PLAYBACK WITH BI-DIRECTIONALITY

BACKGROUND

Unless otherwise indicated herein, the materials described in this section are not prior art to the claims in this application and are not admitted to be prior art by inclusion in this section.

As technology advances, electronic devices, such as televisions and mobile devices continue to provide users access to an increasing amount of digital content in the form of television programs, movies, news programs, and sporting events, etc. One example of an electronic device that is configured to provide programs for a user to use is a set-top box, which is configured to transform medial signals received from external sources (e.g., cable provider) into viewable programs at a television or other type of graphical interface. In particular, during operation, a set-top box can present and switch between various programs as the programs occur in real-time according to presentation parameters provided by the external source. For example, the set-top box may deliver a sporting event program live as the media signals transporting the sporting event program arrive at the set-top box from the cable provider or other source. Additionally, some set-top boxes may enable a user to access stored programs or record live programs to save them in memory for later playback.

SUMMARY

Examples may relate systems and methods for implementing variable speed playback with bi-directionality. A computing device, such as a set-top box associated with a television and/or other type of graphical interface, may process incoming media signals as the incoming media signals are received from an external source (e.g., satellite provider) in order to display the media signals in the form of a program at the television. In addition to transforming the media signals in real-time to play at the television, the computing device may also enable the option to record programs into memory to view at a later time and/or even playback recent portions of a live program through the use of one or more buffers. As such, the computing device may be configured to enable a user to playback a stored or buffered program at a different speed. This way, a user may choose to watch a recorded or buffered program at a faster or slower rate other than the standard rate at which the program is originally intended to play.

In order to promote the possibility of modifying the playback speed, the computing device may utilize an interactive menu that displays the different playback options at the television. The interactive menu may inform the user of the various playback speeds available for playing back a stored or buffer program, which may include providing instructions for the user to follow. Additionally, the interactive menu may include other features, such as a range bar that illustrates a selected playback speed relative to other possible playback speeds on a range bar. In some implementations, the interactive menu may enable the computing device to receive adjustments desired by a user regarding the playback of one or more programs.

To enable the playback of a recorded or buffered program (or portion of a program), the computing device may include one or more video processors and/or audio processors configured to manipulate the video and audio components of the program to play properly according to a playback speed selected by a user. As such, the video processor(s), audio processor(s), and/or possible other components may modify or otherwise transform the video and audio components to eliminate unwanted effects that may result from playing back the program at a faster or slower rate.

In particular, in one example implementation, a method is disclosed that may include receiving, at a computing device, a request to modify a playback speed of a recorded program. The recorded program may include a video component and a corresponding audio component. In addition, the method may include providing an interactive menu that enables a selection of a new playback speed for the computing device to provide the recorded program to a graphical interface responsive to receiving the request. The interactive menu may show the selection of the new playback speed and may also include a range bar that illustrates the new playback speed relative to a range of available playback speeds. Responsive to providing the interactive menu, the method may include receiving a selection of a given playback speed for the computing device to provide the recorded program to the graphical interface. Additionally, based on the selection of the given playback speed, the method may include processing the video component and the corresponding audio component for playout at the given playback speed, and providing, by the computing device to the graphical interface, the processed video component and the processed corresponding audio component in a combination for playout at the given playback speed.

In another example, a system is disclosed that may include one or more processors, and a memory having stored thereon instructions that, upon execution by the one or more processors, cause the system to perform functions. The functions may comprise receiving a request to modify a playback speed of a recorded program. In some instances, the recorded program may include a video component and a corresponding audio component. Additionally, the functions may comprises, responsive to receiving the request, providing an interactive menu that enables a selection of a new playback speed for the system to provide the recorded program to a graphical interface. The interactive menu may show the selection of the new playback speed and may also include a range bar that illustrates the new playback speed relative to a range of available playback speeds. Furthermore, the functions may include receiving a selection of a given playback speed for the computing device to provide the recorded program to the graphical interface responsive to providing the interactive menu. The functions may also include processing the video component and the corresponding audio component for playout at the given playback speed based on the selection of the given playback speed. Additionally, the functions may comprise providing, to the graphical interface, the processed video component and the processed corresponding audio component in a combination determined based on processing the video component and the corresponding audio component for playout at the given playback speed.

In yet another example, the present application describes a non-transitory computer readable medium having stored therein executable instructions, that when executed by a computing device, cause the computing device to perform functions. The functions may include receiving a request to modify a playback speed of a recorded program. The recorded program may include a video component and a corresponding audio component. Additionally, the functions may include, responsive to receiving the request, providing an interactive menu that enables a selection of a new playback speed for the system to provide the recorded program to a graphical interface. In some examples, the interactive menu may show the selection of the new playback speed and may also include a range bar that illustrates the new playback speed relative to a range of available playback speeds. Furthermore, the functions may also include, responsive to providing the interactive menu, receiving a selection of a given playback speed for the computing device to provide the recorded program to the graphical interface. Additionally, the functions may comprise, based on the selection of the given playback speed, processing the video component and the corresponding audio component for playout at the given playback speed, and providing, to the graphical interface, the processed video component and the processed corresponding audio component in a combination determined based on processing the video component and the corresponding audio component for playout at the given playback speed.

Also disclosed herein are structures configured to facilitate implementation of the disclosed methods. One embodiment may take the form of a computing device (e.g., a communication device, computing system, etc., that includes a communication interface, a processor, data storage, and program instructions executable by the processor for carrying out the functions described herein. Another embodiment may take the form of a non-transitory computer-readable medium having instructions stored thereon for carrying out some or all of the functions described herein.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
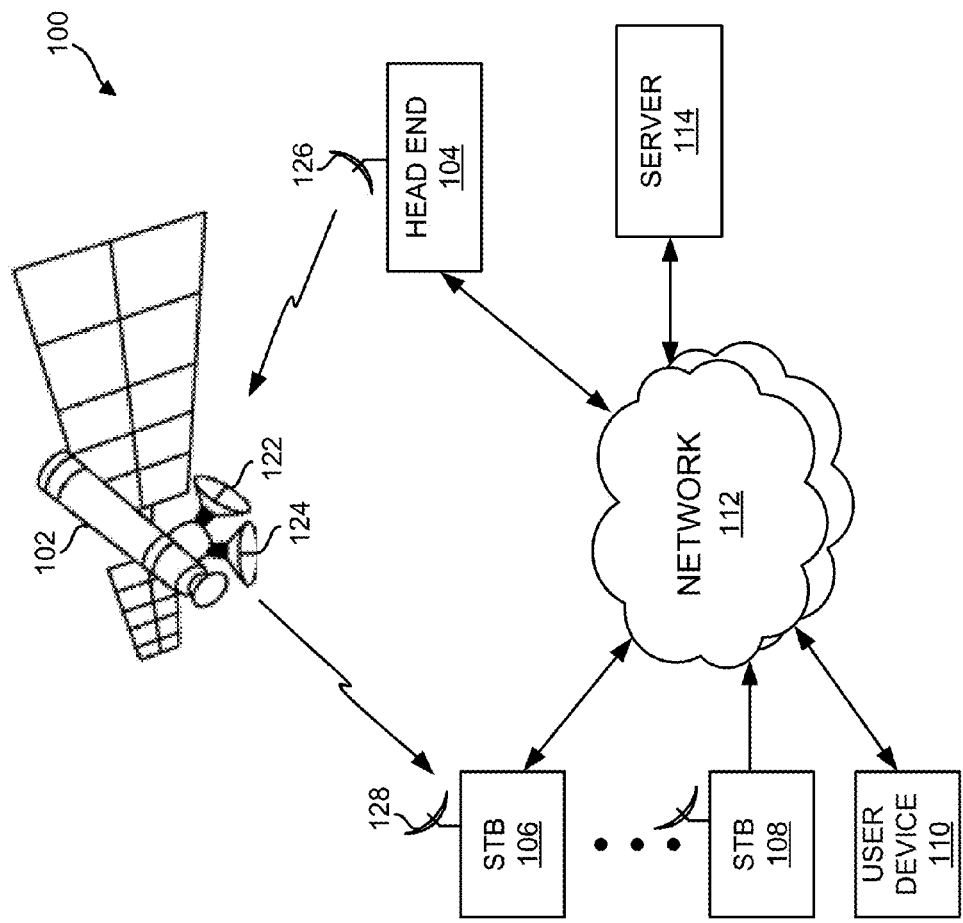
FIG. 1 is a simplified block diagram that illustrates a communication system in which example embodiments of the disclosed methods and entities can be implemented.

In the following detailed description, reference is made to the accompanying figures, which form a part hereof. It should be understood, however, that the arrangements described herein are set forth as examples only. As such, those skilled in the art will appreciate that other arrangements and elements (e.g., machines, interfaces, functions, orders of functions, etc.) can be used instead or in addition. Further, many of the elements described herein are functional entities that may be implemented as discrete or distributed components or in conjunction with other components, and in any suitable combination and location. Various functions described herein as being performed by one or more entities may be carried out by hardware, firmware or software logic. For instance, various functions described herein may be carried out by a processor executing instructions written in any suitable programming language and stored in memory.

In this description, the articles "a" or "an" may be used to introduce elements of examples. The intent of using those articles is that there can be one or more of the elements. The intent of using the conjunction "or" within a described list of at least two terms can indicate any of the listed terms or any combination of the listed terms. Additionally, the use of ordinal numbers such as "first," "second," "third" and so on is to distinguish respective elements rather than to denote a particular order of those elements.

Examples for implementing variable speed playback with bi-directionality are described herein. In an example implementation, a computing device may be configured to operate as a set-top box or other type of device that processes incoming media signals received from external sources in order to output the corresponding programs of the incoming media signals to a television or other type of interface (e.g., computer screen, mobile phone). As such, the computing device may receive the incoming signals that correspond to various types of programs from external sources, such as cable providers, the Internet, satellite providers, among others. The incoming signals transporting programs may include various types of content, including but not limited to television shows, books, news reports, sporting events, and musical songs, etc. During operation, the computing device may be configured to enable a user to access and switch between the different programs, which may involve the use of a remote, motion controls, other devices, and/or audio inputs, etc.

In addition, in some example implementations, the computing device may also be provide a user with access to a stored library of programs, which may include the ability to add to the stored library or generate a new library by selecting programs to record at the computing device. For example, the computing device may use a recorder within the computing device to record a program as the program arrives the computing device in incoming media signals. Similarly, the computing device may also be configured to replay recent portions of a live program by storing recent portions of the live program into a buffer as the live program plays in real-time. Other ways for the computing device to record portions or entire programs may exist as well. Overall, the computing device may be configured to provide options for a user to view programs other than viewing the program in real-time according to the schedule of the cable provider or other external source of programs (e.g., satellite provider).

In order to view a recorded, stored, or buffered program, the computing device may be configured to playback the program at a playback speed. Ordinarily, the computing device may be configured to playback the recorded, stored, or buffered program at the original presentation speed associated with the program. The original presentation speed associated with the program may represent the speed at which the computing device would have played the program if the computing device had transmitted the program straight to the television in response to receiving the media signals of the program from the external source. However, as shown in examples described herein, the computing device may also be configured to playback a recorded, stored, or buffered program (or a portion of the program) at different playback speeds, including causing the program to play at the television at a faster speed (e.g., fast forward) or a slower speed (e.g., slow motion). Playing back a program at a different playback speed may involve the computing device processing the program to ensure proper quality for both the audio and video quality for playout at a given playback speed. Additionally, in some instances, the computing device may also include components that enable the computing device to use bi-directionality to playback a recorded program in reverse (i.e., backwards).

To facilitate the playback of stored, buffered, and/or recorded programs at different speeds and bi-directionality, a computing device may be configured to receive inputs from a user expressing that she wishes to modify the playback speed and/or other parameters associated with the presentation of a program. Additionally, the computing device may also be equipped with components that enable the computing device to modify the playback speed according to the inputs provided by a user.

In some example implementations, the computing device may cause an interactive menu to display at the graphical interface (e.g., television) that enables a user to select a new playback speed for playing a stored, buffered, or recorded program. The computing device may display the interactive menu as result of receiving an input from a user that requests a modification of the playback speed of a program and/or may be configured to provide the interactive menu as a result of other parameters, such as the user selecting a program to watch from a library of stored (e.g., recorded) programs. As such, the computing device may use the interactive menu to inform the user that the computing device is capable of modifying the playback speed of a program based on the input of the user as well as other possible information.

Within some examples, the interactive menu may exist in various configurations. In some instances, the interactive menu may show a drop down menu that allows a user to pick from predefined playback speeds, including slower and faster speeds, for the computing device to present the desired program to the graphical interface. Similarly, the interactive menu may allow a user to pick a particular speed using numerical inputs on a remote or other device for playing back a recorded program. In addition, the interactive menu may allow the user to view a selected playback speed relative to other available playback speeds using a range bar or other visual component. This way, the user may see that the computing device can speed up or slow down the presentation of a recorded program to different extents. Additionally, the interactive menu may also enable a user to select a repeat option and/or a reverse option, which may cause the computing device to modify the presentation of a program for playout. In some instances, the interactive menu may enable a user to select separate playback speeds for the video and corresponding audio components of a program. Other example configurations of interactive menus may exist as well.

Furthermore, the computing device may provide the interactive menu at a graphical interface in various ways. For example, the computing device may cause the interactive menu to appear on a television screen in a split screen format, which may enable a user to select a speed for modifying the playback of a program while simultaneously watching another program, such as a live program occurring based on the schedule of the external source. In other instances, the computing device may provide the interactive in a manner that the interactive menu appears on top of a program playing the background. Other example ways of displaying the interactive menu may exist as well.

In order to enable bi-directional playback of recorded, stored, and/or buffered programs, the computing device may include respective components, such as video processor(s) and/or audio processor(s) that may manipulate the video and audio components of a selected program to enable the computing device to playback the program at the desired playback speed of the user. In some cases, the video processors, audio processors and/or other possible components of the computing device may transform, expand, compress, and/or shift the video and audio components associated with a recorded program to permit a modification in the playback speed without any unwanted effects, such as poor resolution, distortion, etc. The modifications to transmitting the video and/or audio of a recorded program may depend on the playback speed selected as well as other possible parameters, such as the resolution of the video, the types of audio, etc.

As indicated, the computing device may be configured to adjust one or more parameters associated with the playback of a stored program. For example, the computing device may enable the user to select to playback a stored program at a faster speed so that the user may watch and/or hear the program in less time. Similarly, the computing device may also enable the user to select a slower playback speed that causes the computing device to slow down the video and/or audio so that the program takes a longer duration of time to complete, which may enable the user to observe the program more closely, for example. Furthermore, the computing device may be configured to playback a recorded program in reverse, which may involve shifting and/or muting the audio while the computing device plays back images of the video in reverse.

Likewise, in some cases, the computing device may also enable the user to playback a buffered portion of a live program. As one example illustration of a buffer playback, a computing device may be showing a golf tournament at a television as the media signals of the golf tournament are received from an external source in real-time. While the computing device is transmitting the processed media signals to the television, the computing device may also be storing a recently televised portion of the golf tournament in a buffer. This way, the computing device may provide the user with the opportunity to re-watch all or a portion of the recently televised portion of the golf tournament stored in the buffer. For example, the computing device may now enable the user to playback a recent swing of a golfer at a slower playback speed (e.g., slow motion) one or more times since the recent swing of the golfer had been stored within the buffer. The user may find the swing using rewind options available at the computing device and may watch the swing at a variety of playback speeds, including watching the swing in slow motion while hearing the audio associated with the swing in good quality. That way, the user may feel a deeper connection to the golf tournament and utilize the computing device more often. Additionally, the computing device may perform a similar process using the live golf tournament if the user had programmed the computing device to also record the golf tournament in addition to transmitting the golf tournament in real-time to the television.

As indicated above, components of the computing device, such as video processor(s) and/or audio processor(s) may process the video and corresponding audio components of a program to allow playback of the program at a modified speed while minimizing unwanted effects. For example, the computing device may eliminate or help reduce unwanted changes in audio pitch and/or video choppiness during the playback of a stored or recorded program at a different speed. In some instances, the computing device may process the video more than the audio to remove unwanted visual effects that may arise at a particular playback speed. Similarly, in other instances, the computing device may process the audio more than the video to remove unwanted effects in the audio during playback.

In addition, in some instances, the computing device may further be configured to determine one or more shifts between the audio and video that may improve the playback of the program at a speed selected by a user. For example, the computing device may determine that shifting the audio relative to processed video during playback of a recorded program may enable the user to receive both the video and audio of the recorded program at a selected playback speed with minimal unwanted effects. Shifting the audio may enable the computing device to still play high quality audio with the processed video in cases where the computing device may not be able to properly speed up or slow down the audio to the same extent as the video without quality issues. In some instances, the computing device may process and/or shift the audio after determining that the playback speed selected by the user is above a threshold speed that causes problems for keeping the quality of the speed up audio high. That way, the shift in audio relative to the video may enable the computing device to still provide the program at the desired faster playback speed.

Likewise, a similar situation involving shifting the audio relative to the video may occur if the user selects a playback speed slower than a threshold playback speed. Slowing down the audio too much to match video may cause too many unwanted effects, such as inaccurate pitches in tones, etc. In response, the computing device may merely shift the audio (with or without processing the audio to play at a slower speed) relative to the processed video that shows the images of the video at a slower presentation rate. Depending on the playback speed selected by a user and possibly other parameters, the different processors may be configured to compress, expand, and otherwise modify the video component and/or corresponding audio component associated with a recorded program in order to still provide the program according to the selected playback speed at good quality.

Additionally, in some further examples, the computing device may be configured to automatically adjust the playback speed of a recorded or otherwise stored program based on a time limit or other information provided by a user. In particular, in some instances, the computing device may enable the user to specify an amount of time that she has to watch an entire program or program(s). In response to receiving the amount of time, the computing device may determine a proper playback speed (e.g., faster playback speed) that enables the user to watch the entire program or programs without resulting in any unwanted effects during playback. As a result, the user may watch the entire program without having to select a proper playback speed and without missing an end portion of the program, but rather simply indicating a time for the computing device to complete playing back the program. Additionally, the computing device may provide other options regarding modifying playback of one or more programs.

I. EXAMPLE COMMUNICATION SYSTEM

Referring now to the figures, FIG. 1 is a simplified block diagram that illustrates a communication system 100 in which examples of the disclosed methods and entities can be implemented. As shown in FIG. 1, the communication system 100 may include a satellite 102, a head end 104, one or more set-top boxes 106, 108, one or more user devices 110, one or more networks 112, and one or more servers 114. Within other example configurations, other devices may also be included in the communication system 100. It should be understood that, although not illustrated, multiple satellites, head ends, servers, and other components might be included in the communication system 100. Moreover, while multiple components are illustrated separately, it should be understood that one or more of the components may be implemented as distributed components.

Satellite 102 may include one or more antennas 122, 124 configured to send and receive digital or analog signals to one or more devices in the communication system 100. For instance, satellite 102 may include a first antenna 122 configured to receive data via an uplink signal from a device, such as head end 104. Satellite 102 may also include a second antenna 124 that may transmit data via a downlink signal to a receiving device. The receiving device may be a mobile device or a stationary device. Set-top boxes 106, 108 or user device 110 may be a mobile device or a stationary device. In some examples, a single antenna may be used to receive data via an uplink signal and transmit data via a downlink signal. Other examples are also possible.

Head end 104 may include a transmitting antenna 126 for communicating data using one or more signals. For instance, transmitting antenna 126 may send signals to the antenna 122 at satellite 102. Satellite 102 may in turn send downlink signals to a receiving device, such as set-top box 106. In another instance, head end 104 may communicate data to set-top box 106 via a network 112. Network 112 may be representative of one or more types of networks, such as a public switched telephone network, a home private-network, the Internet, a mobile telephone network, or other type of network.

Set-top boxes 106, 108 are examples of receiving devices configured to receive data from satellite 102 or network 112. For example, set-top box 106 may include or be configured to connect to antenna 128 for receiving downlink signals from antenna 124. Set-top box 106 may also include one or more components structured and arranged to receive signals from network 112. The type of programs, content, and number of signals received by set-top box 106 may vary. For instance, the signals may be media signals that may include video or audio signals. Data sent via the media signals may include content, program data, images, requests, or the like. Other examples are also possible.

In some examples, set-top boxes 106, 108 may be interconnected with one or more devices in the communication system 100 via a local network (not illustrated). The local network, which may be a wired network or wireless network, may be used to interconnect set-top boxes 106, 108 within a household, multi-dwelling unit, or commercial building. The local network may also allow for multi-room viewing of content stored on a first set-top box (such as set-top box 106) and communicated to a second set-top box (such as set-top box 108) through the local network. The stored content can comprise content a set-top box 106 receives from antenna 128.

User device 110 may include a variety of stationary or mobile computing devices. For example, user device 110 may include a landline telephone, cellular telephone, smartphone, personal computer, laptop computer, tablet computer, personal digital assistant (PDA), portable media player, or other computing device now known or later developed. User device 110 may be configured to send or receive data in a variety of ways. For example, user device 110 may receive downlink signals from antenna 124. In another example, user device 110 may send or receive signals from network 112. In yet another example, user device 110 may send or receive signals from one or more devices in the communication system 100. For instance, user device 110 may send or receive signals from set-top boxes 106, 108 via network 112. Other examples are also possible.

Communication system 100 may also include one or more servers, such as a server 114. Server 114 may be configured to receive signals from set-top box 106 via network 112. In some instances, the signals may include one or more requests for information relating to a service available at set-top box 106. Additionally, server 114 may facilitate communication of various components within communication system 100. For example, server 114 may facilitate communication between set-top boxes 106, 108, including network 112. Other examples of servers are also possible.

II. EXAMPLE COMPUTING DEVICE

Figure 2:
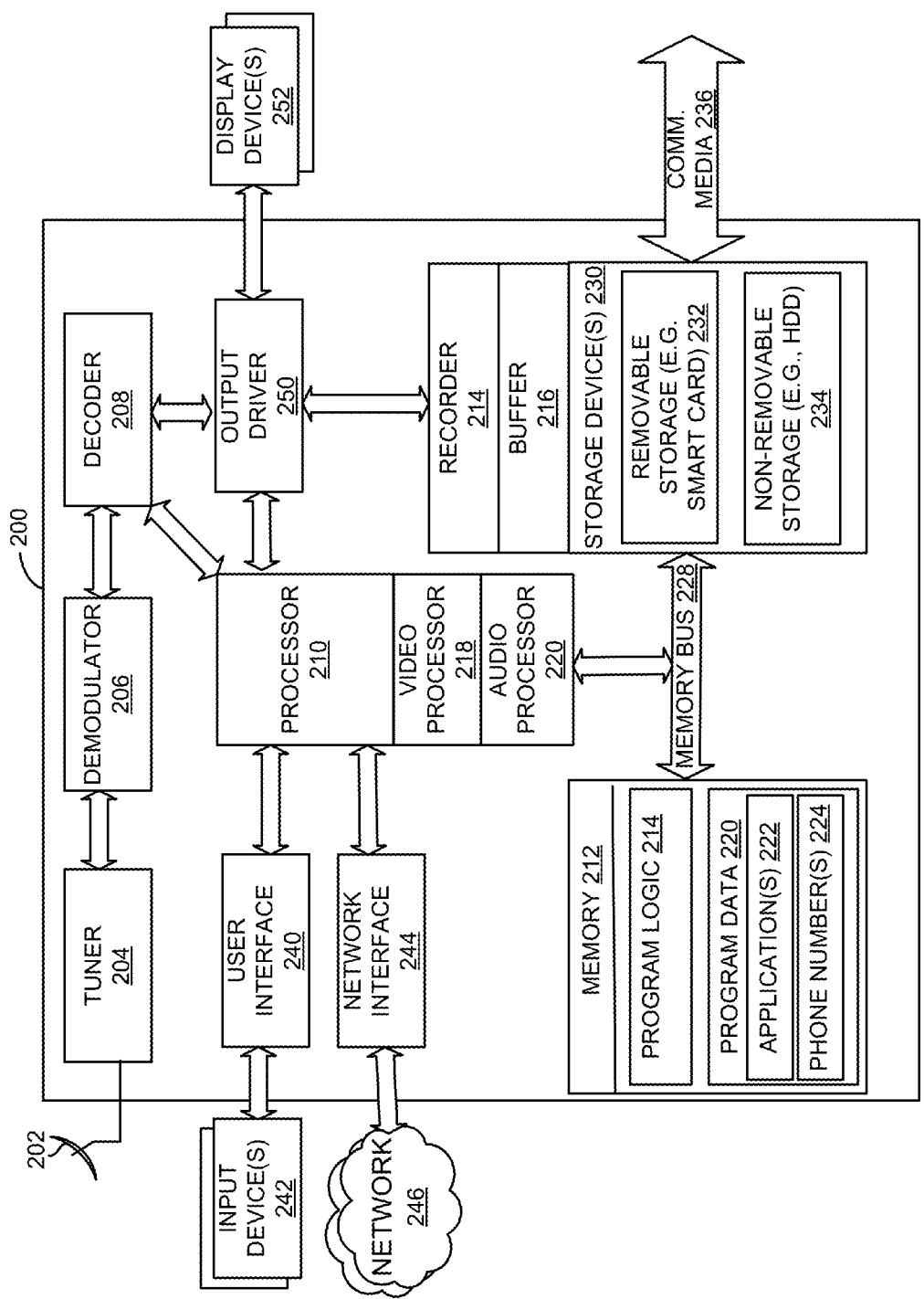
FIG. 2 is a functional block diagram that illustrates an example computing device used in a communication system.

FIG. 2 is a functional block diagram that illustrates a computing device used in a communication system in accordance with examples described herein. Computing device 200 may take a variety of forms. For example, computing device 200 may comprise or be arranged as a set-top box (such as set-top boxes 106, 108 of FIG. 1). The set-top box may be used for television and/or other media. As another example, computing device 200 may comprise or be configured as other types of computing devices, such as a landline or cellular telephone, smartphone, personal computer, laptop computer, tablet computer, personal digital assistant (PDA), portable media player, or other computing devices now known or later developed. Other examples of computing device 200 may exist.

Computing device 200 may include an antenna 202, a tuner 204, a demodulator 206, a decoder 208, a processor 210, a memory 212, a recorder 214, a buffer 216, a video processor 218, an audio processor 220, one or more storage devices 230, a user interface 240, a network interface 244, and an output driver 250. Although, a particular configuration of computing device 200 is illustrated, the configuration is merely representative of various possible receiving devices. For example, although only one tuner 204, one demodulator 206, and one decoder 208 are illustrated, multiple tuners, demodulators, or decoders may be provided within computing device 200. The components described in FIG. 2 may be communicatively linked by a system bus, network, and/or other connection mechanisms. Additionally, in other examples, computing device 200 may include more or less components. In some instances, the components may be distributed across multiple entities.

Computing device 200 may be configured to receive an input signal, such as a television signal, from an external source. The input signals may vary within examples, and may correspond to television programs as well as video signals and/or audio signals. As indicated, the computing device 200 may receive the input signal from an external source. Different external sources may exist, including, but not limited to, a cable provider, telephone company, local antenna, the Internet. Additionally, computing device 200 may connect to other sources, such as DVD or VHS tape players, video game systems, among other possible sources.

During operation, computing device 200 may be configured to present incoming programs at a presentation speed to a graphical interface, such as a television screen. Additionally, in some instances, computing device 200 may be capable of providing programs to the graphical interface in different modes other than a standard presentation mode, such as a fast forward or slow-motion playback mode. Further, computing device may perform other various operations, including a recording mode as well as playing multiple programs simultaneously using one or more graphical interfaces. Other modes of operation of the computing device 200 may exist as well.

As shown in FIG. 2, computing device 200 may include one or more antennas (e.g., antenna 202). Antenna 202 may be one of a number of different types of antennas that may include one or more low noise blocks downconverters (LNB) associated therewith. For instance, antenna 202 may be a single antenna for receiving signals from a satellite (such as satellite 102 of FIG. 1), network (such as network 112 of FIG. 1), or terrestrial source. In another instance, antenna 202 may include multiple antennas for different orbital slots. In yet another instance, signals and other items described as being received by antenna 202 can be received by network interface 244 by way of a coaxial cable or other communication link. In that regard, one or more signals or items received at network interface 244 can be forwarded to tuner 204. Additionally, antenna 202 may enable computing device 200 to communicate with other computing devices using various wireless communication technologies. Other operations of antenna 202 may exist.

Tuner 204 may be configured to receive signal(s) using antenna 202. In some instances, the signal may be a media signal that may include video or audio signals. For example, the signal may be a digital signal, analog signal, Internet Protocol (IP) packets, among other possibilities. For illustration purposes, incoming signals may represent television signals with the content representative of one or more programs. Additionally, example signals that the tuner 204 may receive may vary based on the type of signal. For example, the content may include television programming content, program guide data or other types of data. Tuner 204 may communicate the signal to demodulator 206 via a wired or wireless connection.

In some example implementations, tuner 204 may convert a radio frequency analog television or digital television transmission into audio and video signals, which can be further processed to produce sound and a picture. Different tuners may be included within computing device 200. Tuner 204 may be configured to perform other operations within examples.

Additionally, computing device 200 may include one or more demodulator (e.g., demodulator 206), which may receive the signal and demodulate the signal to form a demodulated signal. For example, demodulator 206 may demodulate incoming radio frequency (RF) television signals to produce a video signal. Demodulator 206 may perform other operations within examples. Furthermore, computing device 200 may include one or more decoder(s) 208 that may decode the demodulated signal to form a decoded signal or decoded data. The decoded signal may be sent to processor 210 or output driver 250. However, decoder 208 may be configured to perform other operations in examples.

Processor 210 may be any type of processor, such as a microprocessor, a microcontroller, a digital signal processor (DSP), multicore processor, etc. Processor 210 may be used to coordinate or control tuner 204, demodulator 206, decoder 208, and any other components of computing device 200 that may or may not be illustrated in FIG. 2. In some implementations, processor 210 may include an internal memory controller (not illustrated). Yet other implementations may include a separate memory controller that can be used with processor 210. As shown in FIG. 2, processor 210 may include and/or connect to video processor 218 and audio processor 220. In other example implementations, computing device may include general processors, such as processor 210, and may also include separate video and/or audio processors. In some instances, processor 210 may perform the processes of video processor 218 and/or audio processor 220.

In addition, computing device 200 is shown including memory 212. Also shown in FIG. 2 is a memory bus 228 that can be used for communicating between the processor 210, video processor 218, audio processor 220, and memory 212. In other example configurations, components of computing device 200 may communicate and access memory 212 through other possible connections.

Memory 212 may be any suitable type of memory. For example, memory 212 may include a non-transitory computer-readable medium, for example, such as computer-readable media that stores data for short periods of time like solid-state memory, flash drives, register memory, processor cache and Random Access Memory (RAM). The computer-readable medium may also or alternatively include non-transitory media, such as secondary or persistent long-term storage, like read only memory (ROM), optical or magnetic disks, compact disc read only memory (CD-ROM), for example. The computer-readable medium may also be any other volatile or non-volatile storage system. The computer-readable medium may, for example, be considered a computer-readable storage medium or a tangible storage device.

Memory 212 may include program logic 214 and program data 220. Program logic 214 may include programming instructions, such as computer executable or logic-implemented instructions. In some examples, the programming instructions may be provided or otherwise obtainable in a downloadable format, such as via network 246 (which may be illustrated as network 112 in FIG. 1). Program data 220 may include program information that can be directed to various data types. For instance, program data 220 may include one or more applications 222 that may execute one or more algorithms arranged to provide input components of computing device 200, in accordance with the present disclosure. Program data 220 may also include data (such as phone numbers 224 or customer account information) that may be stored in memory 212 at computing device 200.

In some implementations, memory 212 may be distributed between one or more locations. For example, at least a portion of memory 212 may reside within processor 210. In another example, all or part of memory 212 may reside on a storage device 230. Storage device 230 may include removable storage devices, non-removable storage devices, or a combination thereof. Examples of removable storage and non-removable storage devices include magnetic disk devices such as flexible disk drives and hard-disk drives (HDD), optical disk drives such as compact disk (CD) drives, R/W CD-ROM, or digital versatile disk (DVD) drives, solid state drives (SSD), memory cards, smart cards and tape drives to name a few. Computer storage media can include volatile and nonvolatile, transitory, non-transitory, removable and non-removable media implemented in any method or technology for storage of information, such as computer-readable instructions, data structures, program modules, or other data.

Among possible operations, memory 212 may be configured to receive and store programs provided by recorder 214. As such, memory 212 may store programs having video and/or audio components for a user to time-shift for later playback. In response to receiving a request, a component of computing device 200, such as processor 210, may be configured to access recorded programs and cause output driver 250 to provide the recorded program to one or more display device(s) 252. In some instances, computing device 200 may store recorded programs in a set order within memory 212 and may be configured to display a list of the recorded programs on a graphical interface. Computing device may cause the output driver 250 to display the list in some format, such as an interactive display, which may enable a user to select one or more recorded programs stored in memory 212.

As shown in FIG. 2, computing device 200 may include a recorder 214 configured to record incoming programs presented to the computing device 200. Recorder 214 may be configured to record the video component and the corresponding audio component associated with one or more programs. In some instances, recorder 214 may be configured to record programs to some form of memory 212. For example, recorder 214 may exist as a digital video recorder or another format. Additionally, recorder 214 may record programs in various formats. In some implementations, recorder 214 may represent one or more recorders configured to record multiple programs simultaneously. Recorder 214 may perform other operations in examples.

Buffer 216 may be configured to temporality store data, such as a portion of a program including the video and audio components. Computing device 200 may include one or more buffers (e.g., buffer 216), which may represent a region of a physical memory storage used to temporarily store programs and/or portions of one or more programs. Buffer 216 may serve to store a portion of a program as the computing device 200 provides the program in real-time to a graphical interface. For example, buffer 216 may store temporarily a recent portion of a program as the output driver 250 delivers the program to the display device(s) 252. In some instances, buffer 216 may vary in the amount of a program or programs that the buffer 216 may temporarily store. Similarly, buffer 216 may be configured to assist in loading one or more respective programs prior to computing device 200 outputting the programs at a display. Buffer 216 may be configured to perform other operations in examples as well. Buffer 216 may exist within memory 212 or may exist as a separate component.

Video processor 218 may represent one or more video processors that may process video components of programs received at computing device 200. Video processor may be configured to perform one or more operations to modify video components, such as data compression, source coding and/or bit-rate reduction processes, among other possible operations. As such, the video compressor may encode information using fewer bits than the original representation of the video component. The compression may be either lossy or lossless, with lossless compression reducing bits by identifying and eliminating statistical redundancy. Lossless compression may prevent a loss of information within the video component.

In some implementations, the video processor may use various coding techniques to reduce redundancy in video data. For example, the computing device 200 may include a video codec in the form of hardware and/or software. The video codec may be configured to compress or decompress a video component associated with a program. Codec may represent a process that a processor of the computing device 200 determines on the amount of change that occurs between frames. Video processor 218 may include an encoder configured to encode one or more portions of a program and/or recorded program. Additionally, video processor 218 may enable the computing device 200 to playback a recorded program in reverse.

In other examples, video processor 218 may represent other types of components (e.g., encoder) configured to manipulate, transform, filter, and/or otherwise process video components of a program received a computing device. As such, video processor 218 may assist in maintaining the quality of a video as components of the computing device 200 speed up or slow down the presentation speed of the video. For example, video processor 218 may enable computing device 200 to deliver a stored, recorded, and/or buffered program at a faster or slower playback speed without unwanted visual effects. Additionally, video processor 218 may be configured to perform other operations impacting one or more parameters associated with the video aspect of a program, including removing and/or duplicating frames of images within the video. In other examples, video processor 218 may be configured to perform other possible operations.

In addition to other possible components, computing device 200 may also include one or more audio processors or other components configured to process audio associated with programs. For example, audio processor 220 may be configured to perform operations relating to the transmission, modification, manipulation, and/or otherwise processing of audio components of programs.

In some instances, audio processor 220 may perform operations relating to audio compression and audio expansion, which may enable computing device 200 to provide programs to a display device 250 with high quality audio. Among other possible operations, the audio processor 220 may process audio in order to minimize unwanted effects, such as distortion. For example, the audio processor may process audio to minimize bass tone intermodulation distortion or distortion of reproduced audio signal. Audio processor 220 may compress or expand audio signals according to a faster or slower presentation speed. Additionally, audio processor 220 may modify one or more parameters of an audio signal associated with a program, such as modifying the bandwidth, power level in decibels (dB), and/or voltage level.

Audio processor 220 may be configured to enable computing device 220 to playback a program at a faster or slower playback speed while maintaining high quality audio during the playback. In particular, audio processor 220 may process audio associated with the program to enable computing device 200 to be able to deliver the program at the higher or slower rate with audio that sounds relatively consistent compared to predefined original levels set for the audio during the standard presentation rate of the same program. For instance, audio processor 220 may be configured to manipulate the audio to occur at a faster or slower rate without unwanted effects. Additionally, audio processor 220 may be configured to perform other operations within examples.

Computing device 200 may also include a user interface 240 that is configured to allow a customer to interact with computing device 200 via one or more input devices 242. User interface 240 may include various programming features, such as an electronic program guide. As previously indicated a program, also described herein as content, may represent any video and/or audio computing device 200 may receive from an external source and provide via the output driver 250 to one or more display device(s) 252. For example, a program may represent video and audio corresponding to a television show, movie, and/or sporting event, among other possibilities. Additionally, a program may represent text, a book, close captioning, music, etc. Programs may exist in various formats and may be transferred between external sources and components of computing device 200 in the different formats. Other examples of programs may exist.

In some examples, user interface 240 may include an electronic program guide that enables a user interaction with the computing device by displaying continuously updated menus showing broadcast programming and/or scheduling information for current and upcoming programming. User interface 240 may enable a user to view current, upcoming, and possibly prior programs (e.g., backward scrolling) through an electronic program guide or similar feature of computing device 200.

Additionally, user interface 240 may represent other forms of interface that enables user interaction with computing device 200. For example, user interface 240 may include motion sensors and/or audio receivers configured to receive input from one or more users. Other examples of user interface 240 may exist.

In some instances, processor 210 or another component of computing device 200 may cause user interface 240 to display an interactive menu that enables a user to modify performance of the computing device 200. Similar to an electronic program guide, an interactive menu may be configured to enable a selection of a different playback speed from a range of possible playback speeds for playing back a recorded program, for example. In some instances, the interactive menu may display an element on top of a program or on a side of the program (e.g., split screen) using the display device(s) 252 that enables a user to select a playback speed of a program or portion of a program. In addition, the interactive feature may include a range bar that illustrates possible changes that a user may select for modifying the presentation speed of a recorded, stored, or buffered program.

As shown, input device(s) 242 may enable a user to communicate with user interface 240 in some instances. Examples of input device 242 may include a remote control (or more simply, a remote), keyboard, a computer mouse, one or more push buttons, a touch screen, a smart phone, a tablet PC, a voice activated interface, motion sensors, or the like. For example, computing device 200 may include an infrared (IR) sensor configured to receive commands provided by a remote control. Input device 242 may be used, for example, to select a channel, select information, change the volume, change the display appearance, power on/off computing device 200, or other functions using user interface 240.

In some examples, input device(s) 242 may be used to cause computing device 200 to record one or more programs, playback a program or segment of a program, fast forward (FF), rewind, or some combination of inputs. Input device 242 may also be used to select a phone number, for example. The process of making a selection with input device(s) 242 may take a variety of forms, such as an action by a user. In some instances, user interface 242 may further include a feature that enables a user to "favorite" or prioritize a channel or particular program(s). As such, user interface 242 may make the prioritized channel(s) or program(s) easier and quicker to access.

Computing device 200 may include network interface 244 for communicating data through one or more networks 246. Network interface 244 may take a variety of forms. For example, network interface 244 may be a WiFi, WiMax, WiMax mobile, data over cable service interface specification (DOCSIS), wireless, cellular, or other types of interfaces. Moreover, network interface 244 may use a variety of protocols for communicating via the network 246. For instance, network interface 244 may communicate using Ethernet, a Transmission Control Protocol/Internet Protocol (TCP/IP), a hypertext transfer protocol (HTTP), or some other protocol.

Computing device 200 may be coupled to a display 252. Display device(s) 252 may be a television, monitor, mobile phone, and/or other device configured to display images. The images may be video, graphics, text, or any variety of other visual representations. In some examples, the display device(s) 252 may include an audio output, such as a loudspeaker, to generate sound waves from media signals received by display 252.

Display device(s) 252 may communicate with an output driver 250 within computing device 200 to facilitate communication between computing device 200 and display device(s) 252. In some implementations, output driver 250 may work in conjunction with a graphics processing unit (not illustrated), which can be configured to communicate with display device 252. Output driver 250 can communicate with display device(s) 252 by a high-definition multiple interface (HDMI) cable, a coaxial cable, some other wired communication link, or wirelessly, among other possible connections.

In some instances, computing device 200 may provide programs to multiple display device(s) 252 simultaneously. Additionally, computing device 200 may present multiple programs to the same display device in a split screen format. For example, computing device 200 may provide a recorded program on half the screen of a display device and provide a live program on the other half of the display device. The computing device 200 may enable the user to select which program audio is played at the display device 252. Other variations of utilizing display device(s) 252 may exist.

In some examples, computing device 200 may communicate directly or indirectly with one or more additional devices using a communication media 236. A communication connection is one example of a communication media 236. Communication media 236 may be embodied by computer-readable instructions, data structures, program modules, or other data in a modulated data signal, such as a carrier wave or other transport mechanism. The communication media 236 may also include wireless, optical, or other information delivery media. A modulated data signal can be a signal that has one or more of its characteristics set or changed in such a manner to encode information in the signal. By way of example, and not limitation, communication media 236 can include wired media such as a wired network or direct-wired connection, and wireless media such as acoustic, radio frequency (RF), infrared (IR) or other wireless media. The communication may include a cellular or cellular data connection, a satellite data connection, etc.

III. METHODS AND EXAMPLES

Figure 3:
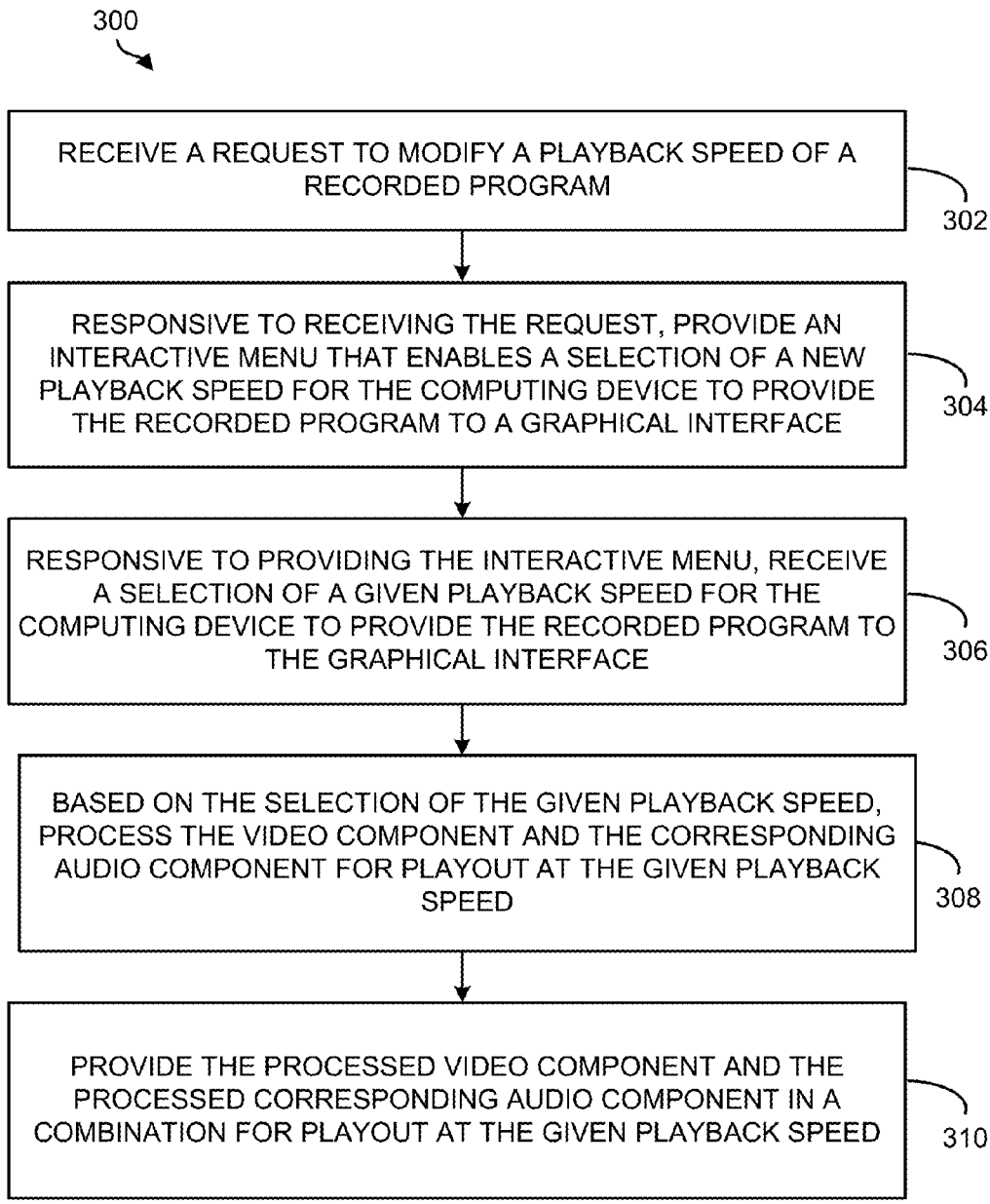
FIG. 3 is a flow chart for variable speed playback with bi-directionality, according to an example implementation.

FIG. 3 is a flow chart for variable speed playback with bi-directionality, according to an example implementation. The flowchart represents an example method 300, which may include one or more operations, or actions as illustrated by one or more blocks 302-310. Although the blocks are illustrated in a sequential order, these blocks may, in some instances, be performed in parallel, and/or in a different order than those described herein. Also, the various blocks may be combined into fewer blocks, divided into additional blocks, and/or removed based upon the desired implementation.

In addition, for the method 300 and other processes and methods disclosed herein, the flow chart shows functionality and operation of possible implementations of present implementations. In this regard, each block may represent a module, a segment, or a portion of program code, which includes one or more instructions executable by a processor for implementing specific logical operations or steps in the process. The program code may be stored on any type of computer readable medium or memory, for example, such as a storage device including a disk or hard drive.

The computer readable medium may include a non-transitory computer readable medium, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example. The computer readable media may also include any other volatile or non-volatile storage system. The computer readable medium may be considered a computer readable storage medium, a tangible storage device, or other article of manufacture, for example.

The non-transitory computer readable medium could also be distributed among multiple data storage elements, which could be remotely located from each other. A computing device or control system that executes some or all of the stored instructions could be any type of computing device, such as the example computing device 200 shown in FIG. 2, respectively. Alternatively, the computing device or system that executes some or all of the stored instructions could be another computing device or system, such as a server. In addition, each block in FIG. 3 may represent circuitry that is wired to perform the specific logical functions in the process.

Example methods, such as the method 300 of FIG. 3, may be carried out in whole or in part by a system, computing device, or multiple systems. Accordingly, example methods could be described by way of example herein as being implemented by a computing device (e.g., set-top box, mobile phone), a server, or a network of computing devices. However, it should be understood that an example method may be implemented in whole or in part by other computing devices or separate from the computing system.

At block 302, the method 300 may include receiving, at a computing device, a request to modify a playback speed of a recorded program. As previously described herein, a computing device, such as set-top box 106 in FIG. 1 or computing device 200 in FIG. 2, may be configured to relay incoming media signals from external sources and transmit the media signals in a program format to televisions and/or other types of graphical interfaces. In addition, the computing device may also be configured to enable a user to record and store programs as the programs arrive at the computing device, access a library of previously stored programs, stream programs, and/or playback a portion of a program stored within a buffer.

During operation, the computing device may receive inputs requesting the computing device to modify one or more parameters associated with the delivery of one or more programs at a television or other type of graphical interface. The computing device may receive the inputs from user(s), other computing devices, etc.

In addition, the computing device may receive the inputs through various technologies. For example, the computing device may receive a request via a remote control.

Similarly, in other instances, the computing device may receive request(s) via motion sensors that detect motion inputs and/or microphone(s) that detect audio inputs provided by a user. Other ways of receiving inputs may exist within examples.

In some cases, the inputs may provide information for the computing device to utilize. For instance, an input may specific that the computing device should initiate a playback speed modification process. Other inputs may request for the computing device to change other parameters associated with the delivery of one or more programs at a graphical interface. The inputs may request for the computing device to access other programs, change the channel, record programs, and adjust volume, among other possibilities.

In one example, the computing device may receive an input associated with a stored program. The input may specify that the user wants for the computing device to deliver the stored program to a television according to particular delivery parameters, which may include adjusting the playback speed associated with delivering the program. Similarly, the computing device may receive a different input that may request that the computing device enable the user to access a recent portion of a live program stored in a buffer so that the user may specify a part of the program for the computing device to re-deliver to the television. The computing device may also receive a request to playback a program in reverse. Other examples of input requests may exist.

At block 304, the method 300 may include, responsive to receiving the request, providing an interactive menu that enables a selection of a new playback speed for the computing device to provide the recorded program to a graphical interface. As indicated, the computing device may receive a request change one or more parameters associated with the delivery of a program to a graphical interface, which may include a request to modify the playback speed associated with the program. As a result, the computing device may cause an interactive menu to display at the television or other type of graphical interface, which may enable a user to select changes to one or more parameters, such as a playback speed, associated with the playback of the program.

Example interactive menus may vary in some implementations. Some example interactive menus may show possible options for the computing device to use to modify the parameters associated with providing a program. For example, the computing device may use an interactive menu that displays a range of playback speeds available for the user or other source to select to modify the playback of a particular program. The interactive menu may include a scroll down menu or other ways of displaying information to a user. In some examples, the computing device may utilize an interactive menu that includes a range bar that represents a range of speeds available for modifying the playback speed of a program. The range bar may show a position of a selected playback speed relative to other possible playback speeds.

Furthermore, the computing device may provide the interactive menu to the user in a variety of ways. In some instances, the computing device may provide the interactive menu on top of a programming playing on at the graphical interface. That way, the user may view the options within the interactive menu in the foreground while another program may continue to play in the background.

In another example implementation, the computing device may cause the interactive menu to display in a first portion while using the other portion to display other information, such as another program. As such, the computing device may display the interactive in a split screen format. Additionally, in some examples, the computing device may not use an interactive menu.

In some examples, the computing device may show the interactive menu in response to receiving a request to modify a program that the computing device can modify the delivery for. For example, the computing device may ignore a request to modify the delivery speed of a live program since the computing device may not have any video or audio data stored in memory or a buffer for the live program.

Additionally, in other examples, the computing device may receive a direct input specifying changes to the delivery of a program, such as an input specifying a new playback speed for presenting a recorded program. As a result, the computing device may not utilize an interactive menu.

In additional examples, the computing device may provide an interactive menu that enables a user or another source to select a first playback speed for the computing device to playout the video component and a second playback speed for the computing device to playout the audio component. For example, the interactive menu may include multiple drop down menus that enables the computing device to receive multiple playback speeds defining separate speeds for the video and audio components of a program. Additionally, the interactive menu may include multiple range bars for displaying the selection of multiple playback speed options for the computing device to playout the program.

At block 306, the method 300 may include responsive to providing the interactive menu, receiving a selection of a given playback speed for the computing device to provide the recorded program to the graphical interface. After the computing device causes the interactive feature to display on the television or through another type of interface, the computing device may receive one or more inputs from the user that specifies at a particular playback speed or multiple playback speeds for delivering the program.

The computing device may receive an input that requests for the computing device to playback a program (e.g., stored or buffered program) at a faster rate (e.g., $1.5x$ the original presentation speed). In other instances, the computing device may receive an input requesting for the computing device to playback a program at a slower rate (e.g., $0.8x$ the original presentation speed). The computing device may be configured to receive inputs specifying other playback speeds as well. In addition, the computing device may enable the user to specify a portion or duration of the program to playback at the selected playback speed.

Furthermore, in some example implementations, the computing device may enable a selection of a playback speed for the video component of a program and a selection of another playback speed for the corresponding audio component of the same program. In other examples, the computing device may enable the modification of other parameters associated with the playout of a recorded, stored, and/or buffered program (or portion of a program).

In some examples, the computing device may request a request to playback a recorded or buffered program in reverse, which may involve playing back the program in reverse at different playback speeds (e.g., slower or faster than the original presentation speed of the video). The computing device may receive the request to playback a recorded program in reverse prior to displaying the interactive menu at the television.

Additionally, the computing device may receive requests to adjust other parameters associated with delivering a program at an interface. For example, the computing device may receive an input that specifies for the computing device to loop a particular portion of a program. That way, the user may re-watch a portion of a program multiple times in a row without providing additional input.

At block 308, the method 300 may further include, based on the selection of the given playback speed, processing the video component and the corresponding audio component for playout at the given playback speed. An example computing device performing the method 300 or similar methods may include various components, such as video and audio processors configured to process the video and audio components of a recorded program. During operation, respective components of the computing device may process the program according to the inputs specifying requested changes to the delivery of a program, such as a new playback speed.

As indicated, the computing device may include audio processor(s) configured to process the audio component of a program in order to deliver the audio according to different playback speeds. The audio processor(s) may manipulate the audio of a program in various ways, including performing audio compression and audio expansion processes. For instance, the audio processor may reduce the waveform of audio for smoother transmission. The audio processors may compress the audio into a lossy or lossless format Additionally, the audio processor(s) may be configured to perform processes involving dynamic range compression, which may include reducing the volume of loud sounds or amplify quiet sounds by narrowing the dynamic range of an audio signal. The computing device may also include an expander configured to increase the dynamic range of an audio signal associated with a program and/or a noise gait that processes quiet sounds quieter by reducing the level of an audio signal that falls below a set threshold level.

In response to receiving a signal that the new playback speed is slower than the original presentation speed of a program, an audio processor may extend the audio of the program while maintaining proper pitches. In contrast, the audio processor may compress the audio in order to prepare the audio for a faster playback speed. In some instances, the rate of the compression or the expansion may depend on the playback speed specified by the user. For example, when the playback speed selected is much faster, the audio processor may need to increase the amount of audio compression. In addition to compressing and expanding, the audio processor may perform operations relating to pitch shift, time stretching, modulation, filtering, equalization, and/or phasing.

In some examples, the audio processor(s) may detect when audio cannot be processed without causing the quality of the audio during playback to drop below a threshold. As a result, the audio processor(s) may use one or more shifts to align the audio relative to the video in a way the enables the computing device to deliver the program according to the new playback speed without reducing the quality of the audio.

In order to process the video component of a program, the computing device may include component(s), such as a video processor or video encoder, to enable the computing device to deliver the video according to the requested playback speed while minimizing unwanted effects. For instance, the video processor may manipulate one or more images within the video component to enable the computing device to provide the images at an accelerated or decelerated rate.

Additionally, the computing device may process the video using one or more video filters or video scalers. For example, a video scaler may convert the display resolution of the video in order to enable the computing device to provide the video at a faster or slower playback speed. In some instances, the video processor may perform processes relating to deinterlacing and/or processes to adjust one or more parameters, such the brightness, contrast, hue, saturation, sharpness, and/or gamma associated with the video component of a program. Further, the video processor may adjust the frame rate conversion based on the desired playback speed selected by a user, which may include mosquito noise reduction and/or block noise reduction to reduce possible distortion that may occur.

In some instances, a video processor may reduce the number of images within a portion or the entirety of a program to facilitate playback of the video at an accelerated rate. The computing device may systematically not show some images in order to allow the computing device to provide the video at a faster playback speed. Furthermore, in some examples, the video processor may perform one or more operations relating to detail enhancement, edge enhancement, motion compensation, and/or processes relating to image calibration. In additional examples, the video processor may perform other processes to enable the computing device to provide the video according to the playback speed selected by the user or other source.

Furthermore, in some example implementations, the computing device may be configured to process the video according to one selected playback speed and process the corresponding audio according to another selected playback speed. The computing device may simultaneously process the video and audio of a program even in situations that the user or other source selected different playback speeds for the video and audio of the program. Other examples of audio and/or video processing may exist.

At block 310, the method 300 may include providing, by the computing device to the graphical interface, the processed video component and the processed corresponding audio component in a combination determined for playout at the given playback speed. In some instances, the computing device may be configured to align the processed video and/or processed audio in order to enable the computing device to playback the media program at a playback speed previously selected by a user. The computing device may transmit the combination to an interface, such as a television or other type of graphical interface, in a manner that minimizes unwanted effects.

In some instances, the computing device may determine that shifting the audio may be required to align the audio and video in a certain manner that enables proper playback without reducing program quality. In particular, the computing device may shift the audio relative to the video to enable the playback of the program without construing the audio and/or video to cause unwanted effects. For example, the computing device may determine that shifting the audio relative to accelerated or decelerated video may improve the quality of the playback based on a user requesting a faster presentation speed above a threshold amount or a slower presentation speed below a threshold amount. Additionally, the computing device may shift the audio in situations that the computing device received separate playback speeds for the computing device to playout the audio and video components of a program. Other examples may exist.

In one example implementation, the computing device may provide the video according to the requested speed as specified by the user, but may provide the audio at a different presentation speed, such as the standard rate. As such, the computing device may reposition or shift the audio relative to the video so that the audio may not couple to the video as originally provided. In such cases, the computing device may even break the audio up played at the standard rate to space the audio throughout the video presented at the user requested presentation speed.

In another example implementation, the computing device may be a set-top box configured to provide a program while simultaneously recording the program. As such, the computing device may be configured to enable the user to playback one or more portions of the recorded portion of the program at variable speeds, including slower and faster rates. The computing device may enable the user to playback a portion of the recorded program at a desired rate selected by the user and simultaneously continue watching the program at live time on a split screen format. The computing device may enable the user to select to receive audio corresponding to the live program or to the recorded program being played at a different presentation speed. As an example illustration of this example implementation, the computing device may enable a user to continue watching a golf tournament program in real time while also enabling the user to simultaneously watch a slow motion swing of a golfer in split screen at a rate that the user selected via inputs to the computing device.

In another example implementation, a computing device may enable a user to input an amount of time that she has available to watch an entire recorded program. In response to receiving an amount of time, the computing device may be configured to modify the playback of the recorded program in order to ensure that the entire program is played in the amount of time specified by the user. In particular, the computing device may process the video and audio of the recorded program at a faster playback speed that allows the user to receive the entire recorded program within the time previously specified. In such an example, the computing device may determine that the entire recorded program may be completed in the original playback speed and not alter the playback speed as a result.

In a further example implementation, a set-top box or other type of computing device may be configured to accelerate or decelerate closed captioning (e.g., text) associated with a recorded program based on a modification in the playback speed of the recorded program. For example, the computing device may transmit the closed captioning to align with accelerated audio. In other examples, the computing device may make further modifications to the presentation of closed captioning.

In another example, a computing device may receive an indication that a user wants the computing device to provide one or more programs in a series to a television or other graphical interface at an accelerated or decelerated playback speed. For example, the computing device may receive an indication that a user wants to watch five programs of a television series at an accelerated playback speed (e.g., 1.2× the original speed). As such, the computing device may provide instructions to components, such as the video and audio processors, to modify the video and audio components of the five programs of the television series to enable the computing device to provide the five programs to the television at the accelerated playback speed. This way, the user may enjoy the five programs of the television series in less time without sacrificing the video or audio quality associated with the five programs. The computing device may further be configured to accelerate faster during advertisements not part of the five programs or even remove the advertisements altogether.

In another example implementation, a computing device may be programmed to buffer the latest portion of a basketball game as the computing device delivers the program live to a television or other graphical interface in real-time as the computing device receives the media signals indicative of the basketball game from an external source. The computing device may be configured to enable a user to playback the latest portion of the basketball game that is temporarily stored in the buffer at various playback speeds, including enabling the user to watch the portion in a backwards. As such, the computing device may receive a request from the user to replay a basketball player performing an amazing dunk or a final shot of the game, for example. The playback may include the audio and video processed according to the requested playback speed. Additionally, the computing device may be further configured to allow the user to playback the buffered portion of the basketball game while also watching the basketball game continue live in another portion of the television (i.e., in a split screen format).

Figure 4:
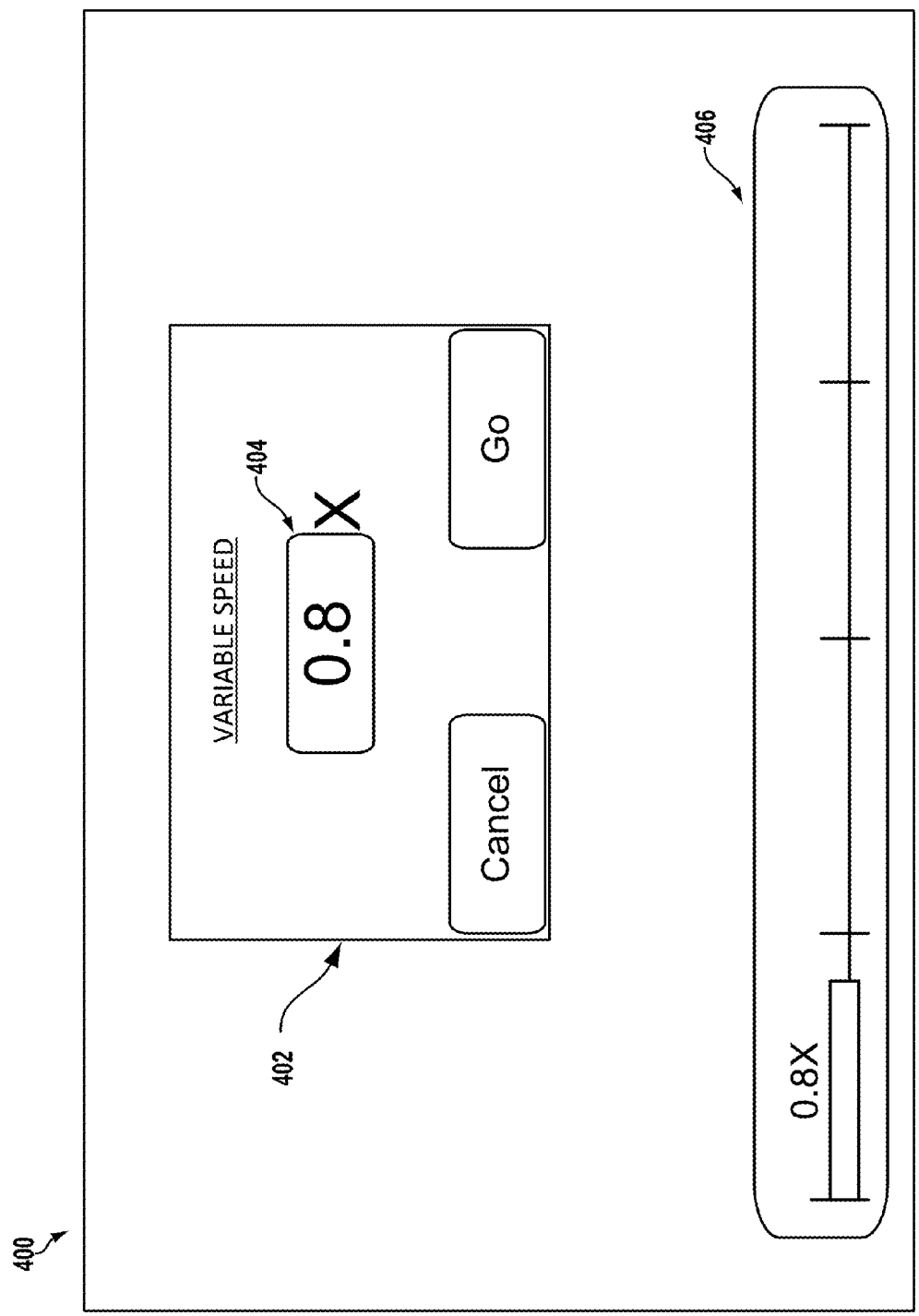
FIG. 4 illustrates an interactive feature for enabling variable speed playback with bi-directionality, according to an example implantation.

FIG. 4 illustrates an interactive menu for enabling variable speed playback with bi-directionality, according to an example implantation. As previously described herein, a computing device, such as a set-top box, may cause interactive menu 400 to display at a television or another graphical interface (e.g., mobile phone screen, computer monitor). Displaying possible options for a user to select from, interactive menu 400 may be configured to include a display element 402 that shows a selected playback speed 404 as well as range bar 406.

As shown in FIG. 4, a computing device may cause interactive menu 400 to display on a television or another graphical display in response to receiving a request from a user to change a playback speed for a recorded or buffered program. In some instances, the computing device may cause the interactive menu 400 to display upon a user selecting for the computing device to playback a recorded program. Furthermore, although interactive menu 400 includes a display element 402 and a range bar 406, other example menus may include more or less visual components. In addition, interactive menu 400 may include other features, such as audio that dictates the options available to the user.

Display element 402 may serve to inform the user that she may select a different playback speed for playing a recorded or buffered program. The display element 402 may vary in placement, configuration, and sizes within examples and may also include additional instructions for selecting a new playback speed. Additionally, as shown in FIG. 4, display element 402 includes an area for displaying the selected playback speed 404. Display element may include a scroll down menu, buttons representing available options, or may arrange information in other ways. Further, display element includes visual options "cancel" and "go" that may further confirm whether or not a user selected to change the playback speed. In other instances, display element 402 may include other visual options or may rely on other sources, such as options on a remote, for a user to select and confirm her selection of a given playback speed.

Additionally, FIG. 4 further illustrates a range bar 406 associated with interactive menu 400. The range bar 406 may be configured to provide information relating to possible playback speeds to a user. In some instances, the range bar 406 may visually represent a selection of a given playback speed relative to other possible playback speeds available for a user to select. In some implementations, the range of available playback speeds represented by the range bar 406 may depend on the computing device and/or the particular recorded or buffered program being played back by the computing device. As shown, the range bar 406 may indicate the point that the selected playback speed is positioned relative to other available playback speeds. In addition, the range bar 406 may update if a user alters the playback speed requested.

In other examples, the range bar 406 may represent other information. For example, the range bar 406 may represent the duration of a recorded program including the current point of the recorded program. The computing device may provide multiple range bars in some examples.

Figure 5:
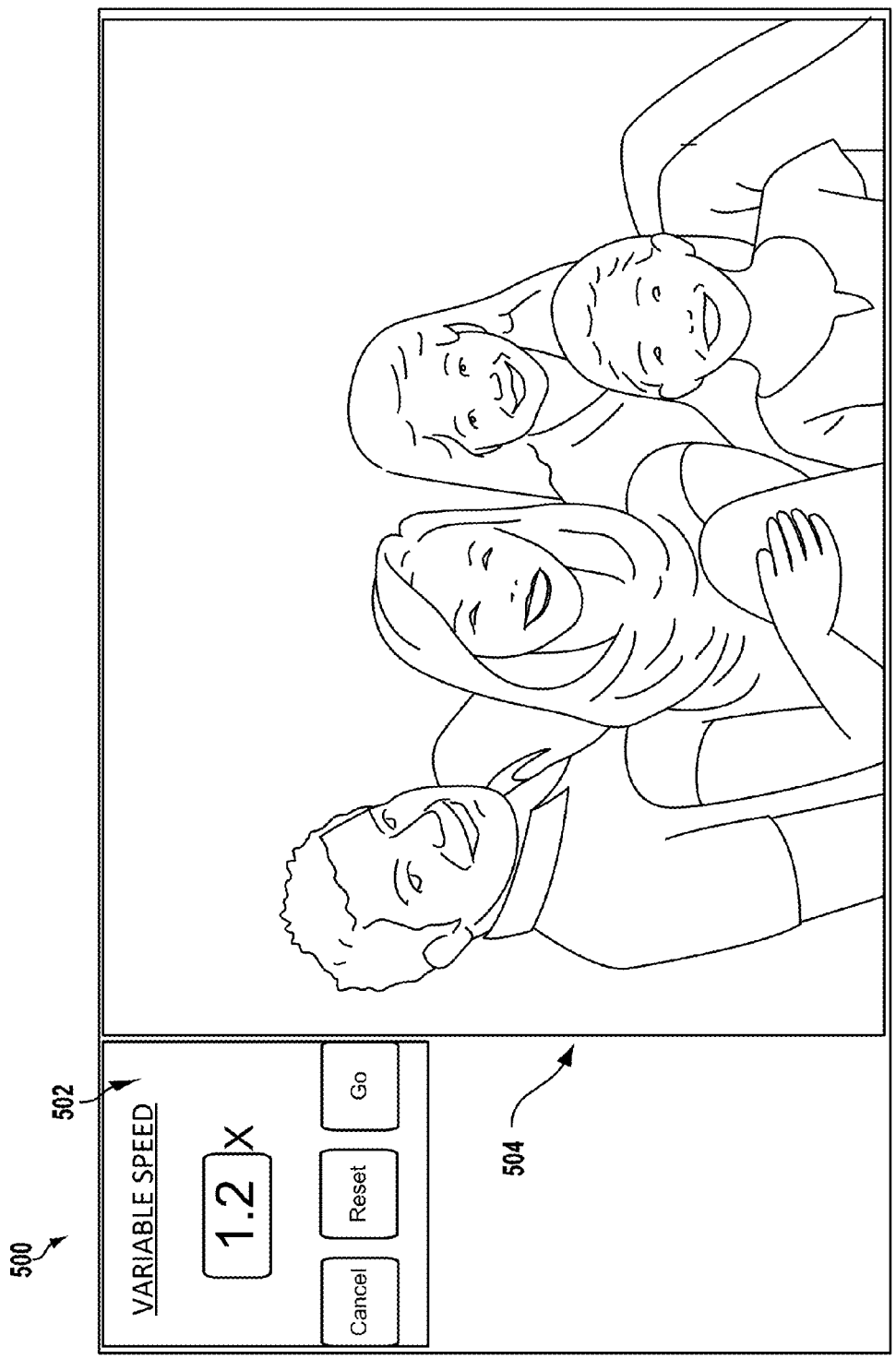
FIG. 5 illustrates another example interactive feature for enabling variable speed playback.

FIG. 5 illustrates another example interactive feature for enabling variable speed playback. Similar to the example provided in FIG. 4, graphical interface 500 is shown displaying an interactive menu 502 positioned in an upper right corner in addition to displaying a video component 504 of a program. Although graphical interface 500 is shown illustrating an interactive menu 502 and the video component 504 of a program, a computing device may cause graphical interface 500 to include more or less visual components within other examples. For example, graphical interface 500 may further show advertisements, textual news alerts, or other information within unused portions of the graphical interface 500. Video component 504 of the program shows a program having a family, but may represent other types of programs, such as news programs, sporting events, movies, etc.

As shown in FIG. 5, the interactive menu 502 may include other options, such as a "reset" option that the interactive menu shown in FIG. 4 did not include. As such, the interactive menu may include a reset option that enables the user to indicate to the computing device that she wants the computing device to switchback the playback speed to the original playback speed intended for the recorded program. In other examples, the interactive menu 502 may include options not explicitly described herein.

Figure 6:
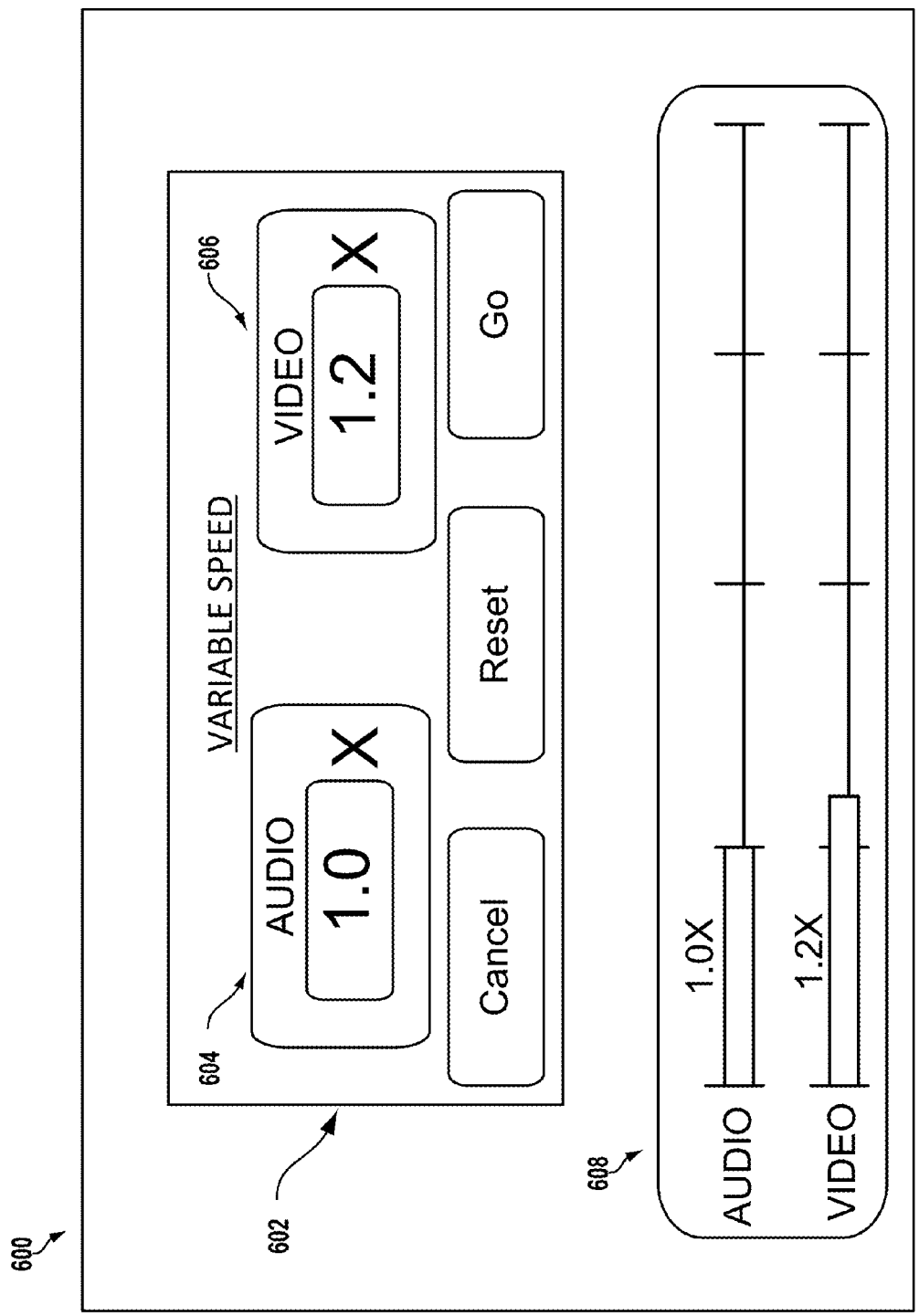
FIG. 6 illustrates an additional example interactive feature for enabling variable speed playback.

FIG. 6 illustrates an additional example interactive feature for enabling variable speed playback. As shown, graphical interface 600 is displaying an interactive menu 602 that includes an audio playback speed option 604 and a video playback speed option 606. In addition, graphical interface 600 also shows a double range bar 608 that illustrates the playback speeds for the audio and video components of a program as selected in the interactive menu 602.

As previously indicated, a computing device may provide different types of interactive menus, which may include interactive menu 602 that enables a user to select separate playback speeds for the audio and the video for the computing device to playout. In particular, the interactive menu 602 includes the audio playback speed option 604 for enabling a user or another source to select a speed for the computing device to process and playout the audio of a recorded, stored, or buffered program. Additionally, the interactive menu 602 includes the video playback speed option 606 that enables the video playback speed option 606 for the user or another source to select a speed for the computing device to process and playout the video of the recorded, stored, of buffered program. This way, the computing device may be configured to enable the user to select separate playback speeds for the audio and video components of a given program. In other examples, the interactive menu 602 may include other options for modifying one or more parameters associated with the playout of a program.

The double range bar 608 includes multiple range bars for displaying audio and video playback speeds selected by a user or another source. The double range bar 608 may reflect the differences or similarities of variable speed playbacks that the user may select in response to the interactive menu 602. In other examples, the double range bar 608 may have other configurations for displaying information to the user.

Figure 7:
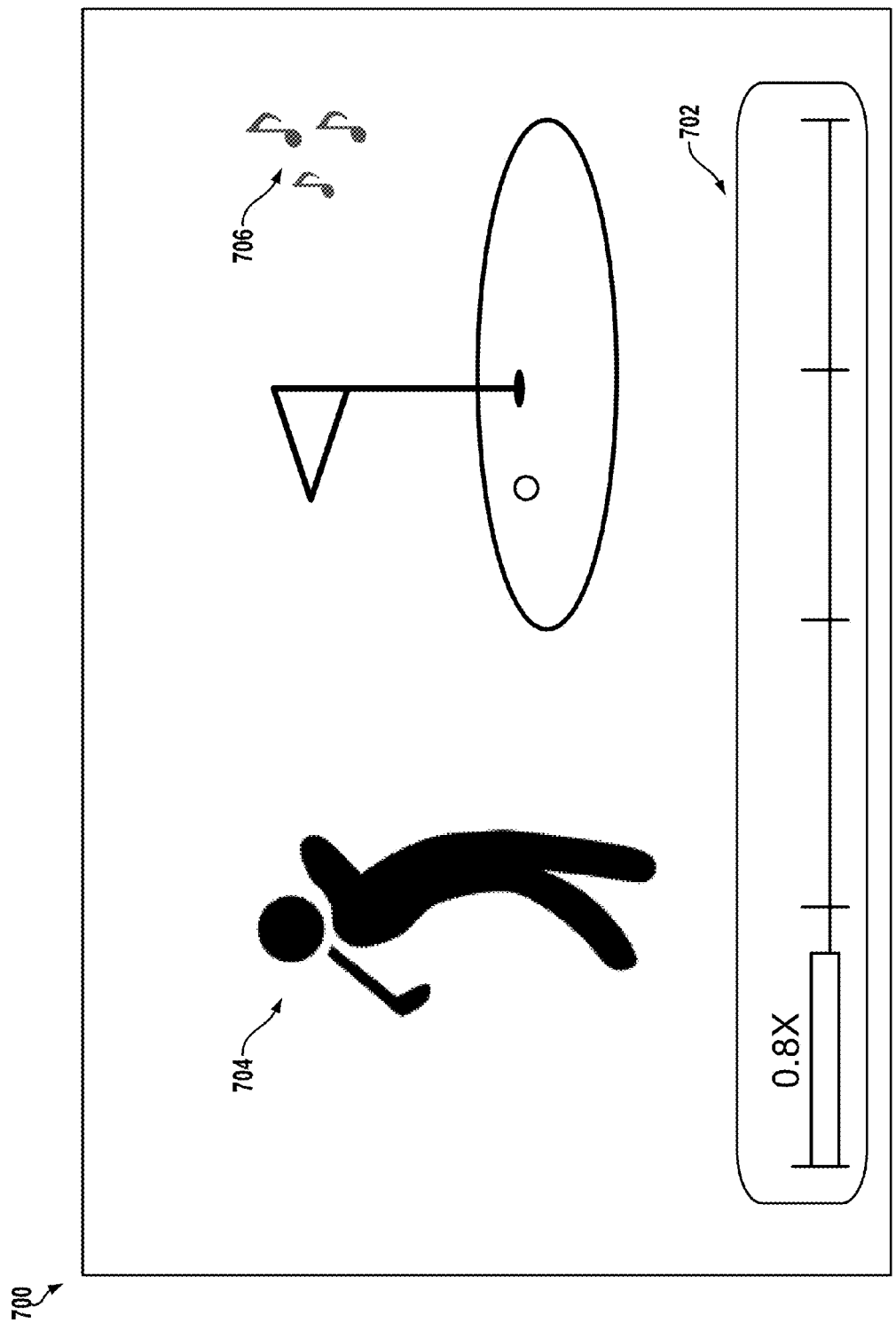
FIG. 7 illustrates an example implementation of variable speed playback of a program.

FIG. 7 illustrates an example implementation of variable speed playback of a program. Interface 700 is displaying a golf program a playback speed of "0.8×" the original presentation speed of the golf program. As such, interface 700 shows a range bar 702 illustrating the selected playback speed of "0.8×" as well as a golfer 704 playing golf with musical notes 706 representing audio associated with the golf program.

Interface 700 may represent any type of graphical interface, such as a television, mobile device, monitor, computer screen, etc. In some implementations, interface 700 may display additional components, such as other programs. As shown, range bar 702 may represent a playback speed selected by a user and may further represent the playback speed relative to other available playback speeds. In some instances, range bar 702 may have a different configuration, such as a vertical alignment. Further, range bar 702 may also represent how much of a recorded, stored, and/or buffered program remains, which may also indicate the current point of the program shown on the interface 700 relative to the entire duration of the program. Additionally, in some implementations, interface 700 may not show range bar 702 or may require a user to provide an input requesting for the computing device to cause the interface 700 to display the range bar 702.

As shown in FIG. 7, interface 700 may receive various types of programs from a computing device, including a golf program. In particular, interface 700 displays a golf program with a golfer 704 attempting to shoot a golf ball onto a putting green. A user may request that the computing device providing the golf program may playback the swing backwards and/or forwards with a different playback speed (e.g., slower or faster). In the example implementation shown in FIG. 7, the computing device is showing the golf swing of golfer 704 in a forward direction, but at a slower presentation speed (e.g., "0.8×") than the original presentation speed of the golf program live. While the computing device provides the portion of the golf program at the slower presentation speed, the computing device may also provide the corresponding audio associated with that portion of the golf program in a modified manner that causes the audio to sync with the slower video presentation. As previously described herein, the computing device may process the audio and/or video components of a program according to a selected playback speed using various components, such as a video and audio processors.

In other examples, the computing device may enable the user to select a backwards option, which may cause the computing device to playback a program in reverse. Playing a program in reverse may involve the computing device muting audio and/or shifting the audio relative to the video to cause the audio to playback in a forward manner relative to the video portion playing back in reverse. Other combinations of playback may exist within examples.

IV. CONCLUSION

It should be understood that arrangements described herein are for purposes of example only. As such, those skilled in the art will appreciate that other arrangements and other elements (e.g., machines, interfaces, functions, orders, groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
receiving, at a computing device, a request to modify a playback speed of a recorded program, wherein the recorded program includes a video component and a corresponding audio component;
responsive to receiving the request, providing an interactive menu that enables a selection of a new playback speed for the computing device to provide the recorded program to a graphical interface, wherein the interactive menu shows the selection of the new playback speed and includes a range bar that illustrates the new playback speed relative to a range of available playback speeds;
responsive to providing the interactive menu, receiving a selection of a given playback speed for the computing device to provide the recorded program to the graphical interface;
based on the selection of the given playback speed, processing the video component and the corresponding audio component for playout at the given playback speed, wherein processing the corresponding audio component includes modifying one or more portions of the corresponding audio component using respective pitch shift and time stretching techniques; and
providing, by the computing device to the graphical interface, the processed video component and the processed corresponding audio component in a combination for playout at the given playback speed.

2. The method of claim 1, wherein the recorded program corresponds to a portion of a live program stored in a buffer as the computing device delivers the live program in real-time to the graphical interface.

3. The method of claim 1, wherein receiving the selection of the given playback speed for the computing device to provide the recorded program to the graphical interface comprises:
receiving a first selection of a first playback speed for the computing device to provide the video component to the graphical interface; and
receiving a second selection of a second playback speed for the computing device to provide the corresponding audio component to the graphical interface.

4. The method of claim 1, wherein providing the interactive menu comprises:
providing a given interactive menu that enables a first selection of a new video playback speed for the computing device to provide the video component to the graphical interface and a second selection of a new audio playback speed for the computing device to provide the corresponding audio component to the graphical interface.

5. The method of claim 1, wherein the computing device is a set-top box.

6. The method of claim 1, wherein, based on the selection of the given playback speed, processing the video component and the corresponding audio component comprises:
processing the video component to enable the computing device to playback the video component according to the given playback speed;
processing the audio component to enable the computing device to playback the corresponding audio component according to at a playback speed slower than the given playback speed; and
wherein providing, by the computing device to the graphical interface, the processed video component and the processed corresponding audio component in the combination for playout at the given playback speed comprises:
generating the combination to enable the computing device to provide the processed video component for playout at the given playback speed and the processed corresponding audio component at the playback speed slower than the given playback.

7. The method of claim 1, wherein, based on the selection of the given playback speed, processing the video component and the corresponding audio component comprises:
processing the video component to enable the computing device to playback the video component according to the given playback speed;
processing the audio component to enable the computing device to playback the corresponding audio component according to at a playback speed faster than the given playback speed; and
wherein providing, by the computing device to the graphical interface, the processed video component and the processed corresponding audio component in the combination for playout at the given playback speed comprises:
generating the combination to enable the computing device to provide the processed video component for playout at the given playback speed and the processed corresponding audio component at the playback speed faster than the given playback.

8. The method of claim 1, wherein the given playback speed is a speed lower than a speed associated with an original playback speed of the recorded program, and wherein based on the selection of the given playback speed, processing the video component and the corresponding audio component further comprises:
processing the video component to enable the computing device to playback the processed video component at the given playback speed; and
processing the corresponding audio component to enable the computing device to playback the processed corresponding audio component at a playback speed that is faster than the given playback speed and slower than the original playback speed of the recorded program.

9. The method of claim 8, wherein providing, by the computing device to the graphical interface, the processed video component and the processed corresponding audio component in the combination determined based on processing the video component and the corresponding audio component comprises:
modifying a position of the processed corresponding audio component relative to the processed video component to generate the combination.

10. The method of claim 1, wherein the given playback speed is a speed higher than a threshold speed associated with an original playback speed of the recorded program, and wherein based on the selection of the given playback speed, processing the video component and the corresponding audio component comprises:

processing the video component to enable the computing device to playback the processed video component at the given playback speed; and processing the corresponding audio component to enable the computing device to playback the processed corresponding audio component at a playback speed that is slower than the given playback speed and faster than the original playback speed of the recorded program.

11. The method of claim 1, wherein providing the interactive menu that enables the selection of the new playback speed for the computing device to provide the recorded program to the graphical interface comprises:

causing the interactive menu to display on a first portion of the graphical interface while the computing device also causes another program to display on a second portion of the graphical interface, wherein the first portion and the second portion of the graphical interface are separate.

12. The method of claim 1, wherein the interactive menu further includes an option to repeat a portion of the recorded program during playback, and wherein the method further comprises:

responsive to detecting a selection of the option to repeat a given portion of the recorded program during playback, providing the processed video component and the processed corresponding audio component in the combination corresponding to the portion of the recorded program in a repetitive loop, wherein the selection of the option to repeat the given portion of the recorded program during playback specifies the given portion for repeating.

13. The method of claim 1, wherein processing the video component comprises expanding or compressing respective portions of the video component based on the selection of the given playback speed.

14. The method of claim 1, further comprising:

receiving an input specifying a time limit for a playback of the recorded program; and based on the time limit for the playback of the recorded program, determining the given playback speed for the computing device to provide the recorded program to the graphical interface.

15. A system comprising:

one or more processors; and a memory having stored thereon instructions that, upon execution by the one or more processors, cause the system to perform functions comprising:

receiving a request to modify a playback speed of a recorded program, wherein the recorded program includes a video component and a corresponding audio component;

responsive to receiving the request, providing an interactive menu that enables a selection of a new playback speed for the system to provide the recorded program to a graphical interface, wherein the interactive menu shows the selection of the new playback speed and includes a range bar that illustrates the new playback speed relative to a range of available playback speeds;

responsive to providing the interactive menu, receiving an input specifying a time limit for the system to provide the recorded program to the graphical interface;

based on the time limit for the playback of the recorded program, determining a given playback speed for the system to provide the recorded program to the graphical interface;

processing the video component and the corresponding audio component for playout at the given playback speed; and providing, to the graphical interface, the processed video component and the processed corresponding audio component in a combination for playout at the given playback speed.

16. The system of claim 15, wherein processing the video component comprises:

determining that the given playback speed is above a threshold speed; and based on determining that the given playback speed is above the threshold speed, processing the video component to include less respective images.

17. The system of claim 15, wherein processing the corresponding audio component comprises:

modifying one or more portions of the corresponding audio component using respective pitch shift and time stretching techniques.

18. A non-transitory computer readable medium having stored therein instructions, that when executed by a computing device, cause the computing device to perform functions comprising:

receiving a request to modify a playback speed of a recorded program, wherein the recorded program includes a video component and a corresponding audio component;

responsive to receiving the request, providing an interactive menu that enables a selection of a new playback speed for the system to provide the recorded program to a graphical interface, wherein the interactive menu shows the selection of the new playback speed and includes a range bar that illustrates the new playback speed relative to a range of available playback speeds;

responsive to providing the interactive menu, receiving a selection of a given playback speed for the computing device to provide the recorded program to the graphical interface;

based on selection of the given playback speed, determining that the given playback speed is above a threshold speed;

based on determining that the given playback speed is above the threshold speed, processing the video component to include less respective images and the corresponding audio component for playout at the given playback speed; and providing, to the graphical interface, the processed video component and the processed corresponding audio component in a combination for playout at the given playback speed.

19. The non-transitory computer readable medium of claim 18, wherein the recorded program corresponds to a portion of a live program stored in a buffer.

20. The non-transitory computer readable medium of claim 19, wherein the function of receiving the request to modify the playback speed of the recorded program comprises:

receiving a given request to playback the portion of the live program stored in the buffer in a split screen format that enables the computing device to continue presenting the live program simultaneously.

* * * * *